United States Patent

Swarup et al.

[11] Patent Number: 6,136,927
[45] Date of Patent: Oct. 24, 2000

[54] PHOSPHATIZED AMINE CHAIN-EXTENDED EPOXY POLYMERIC COMPOUNDS

[75] Inventors: Shanti Swarup; Padmanabhan Sundararaman, both of Allison Park; John M. Dudik, Apollo; Brian K. Rearick, Allison Park; Marie Edla Simeon, Gibsonia, all of Pa.

[73] Assignee: PPG Industries Ohio, Inc., Cleveland, Ohio

[21] Appl. No.: 09/158,853

[22] Filed: Sep. 23, 1998

Related U.S. Application Data

[60] Provisional application No. 60/059,911, Sep. 24, 1997.

[51] Int. Cl.$^7$ ................................................. C08C 19/00
[52] U.S. Cl. ............................................................ 525/386
[58] Field of Search .............................................. 525/386

[56] References Cited

U.S. PATENT DOCUMENTS

| | | | |
|---|---|---|---|
| 4,212,781 | 7/1980 | Evans et al. | 260/29.4 UA |
| 4,497,946 | 2/1985 | Sekmakas et al. | 528/99 |
| 4,503,173 | 3/1985 | Martino et al. | 523/407 |
| 4,600,754 | 7/1986 | Winner | 525/531 |
| 4,987,205 | 1/1991 | Suzuki et al. | 528/104 |
| 5,252,669 | 10/1993 | Maska et al. | 525/112 |
| 5,290,828 | 3/1994 | Craun et al. | 523/423 |
| 5,428,084 | 6/1995 | Swarup et al. | 523/414 |
| 5,464,885 | 11/1995 | Craun | 523/423 |

FOREIGN PATENT DOCUMENTS

| | | |
|---|---|---|
| 1076948 | 10/1993 | China . |
| 0 041 108 | 12/1981 | European Pat. Off. . |
| 0 101 307 | 2/1984 | European Pat. Off. . |
| 0 498 504 A2 | 8/1992 | European Pat. Off. . |
| 0 501 575 A2 | 9/1992 | European Pat. Off. . |
| 0 525 601 A1 | 2/1993 | European Pat. Off. . |
| 0 543 080 A1 | 5/1993 | European Pat. Off. . |
| 0 669 382 A1 | 8/1995 | European Pat. Off. . |
| 63-048359A | 3/1988 | Japan . |
| 63-162072A | 7/1988 | Japan . |
| 02011675A | 1/1990 | Japan . |
| 405320569A | 12/1993 | Japan . |
| 06184387A | 7/1994 | Japan . |
| WO 94/17111 | 8/1994 | WIPO . |

*Primary Examiner*—Edward J. Cain
*Attorney, Agent, or Firm*—William J. Uhl

[57] ABSTRACT

This invention provides a novel phosphatized polymeric product which is formed by: (a) forming an amine-extended resinous composition having unreacted epoxy groups by mixing, under free-radical initiated polymerization conditions, a polymerizable, ethylenically unsaturated monomeric component and a polyepoxide component; and (b) phosphatizing at least a portion of the unreacted epoxy groups of the resinous composition. The present invention also provides novel coating compositions containing the aforedescribed polymeric product. While these novel coating compositions have a number of different uses, they are particularly useful for application to metal substrates such as can end stock since they result in a cured film which has excellent performance properties such as flexibility and extensibility, adhesion, resistance to boiling liquid pack tests and boiling water taste test results.

29 Claims, No Drawings

PHOSPHATIZED AMINE CHAIN-EXTENDED EPOXY POLYMERIC COMPOUNDS

This application claims the benefit of U.S. Provisional No. 60/059,911 filed Sep. 24, 1997.

FIELD OF THE INVENTION

The present invention relates to phosphatized amine chain-extended epoxy polymeric compositions. While these compositions have a number of different uses, they are particularly useful in solvent-borne coatings such as those designed to be applied onto coiled metal stock, and more particularly, those designed to be applied onto the coiled metal stock from which the ends of cans are made, hereinafter referred to as "can end stock."

BACKGROUND OF THE INVENTION

Coatings, particularly those used in the food and beverage metal container industries, are expected to meet a number of requirements in order to be commercially viable. One of these requirements includes their ability to adhere well to the base metal over which they are applied. Another requirement is that they possess a certain degree of flexibility, extensibility and adhesion characteristics which enables them to withstand the fabrication of the container itself and/or the processing, if any, of the container's contents.

Another requirement of a coating which is designed for use in the metal container packaging industry results when the coating is applied in a manner such that it comes into direct contact with the consumer of the container's contents or the contents themselves. Under these circumstances, it is required that the coating not only be non-toxic, but also not adversely affect the taste of the food or beverage which is stored in the coated container.

Yet another requirement of a coating which is designed for use in the metal container packaging industry is the coating's ability to coalesce and/or form a continuous film. Specifically, if these properties are not present, the container's contents might be exposed to metal. This, in turn, can result in problems such as: prematurely corroding the container, contaminating the container's contents, adversely affecting the taste of the container's contents, and the like.

Still another requirement of coatings designed for use in the metal container packaging industry is that they resist "popping." The term "popping" is used in the coating industry to refer to a particular defect in coatings which develops during their curing process. Particularly during the curing process of many coatings, gaseous by-products are formed which can then become trapped within the coating. This problem most commonly occurs in areas where the coating has a relatively high film thickness.

Coating applicators typically need to take special precautions when working with coatings that are prone to popping so as to assure that a maximum allowable coating thickness is not exceeded on any portion of the article being coated. In some cases the speed at which coating is applied (i.e., the "line speed") is limited by a tendency for a coating to pop.

Even another requirement of coatings designed for use in the metal container packaging industry is that they resist "blushing." The term "blushing" is used in the coating industry to refer to another defect in coatings which develops during their curing process. Particularly, the term "blush" refers to a haziness in the film believed to be caused by absorption of water. This defect is particularly evident with container coatings that are subjected to high temperature, high pressure steam conditions during the canning retort process.

A defect that often accompanies blush is "blistering." The term "blistering" is used in the coating industry to refer to a sporadic lifting of the coating as salts, which are present at the interface of the metal substrate and the coating, are dissolved by water which penetrates the film.

As stated above, coatings designed for use on the interior of food and beverage containers should not adversely affect the taste of the container's contents. Taste problems can occur in a number of ways such as by leaching of coating components into the beverage, adsorption of flavor by the coating, a chemical reaction between the container's contents and the coating, the container's contents coming into contact with bare metal due to defects in the coating, and/or a combination thereof.

Since coatings designed for use on the end stock of metal containers are applied thereon prior to the ends being cut and stamped out of the coiled metal stock, in addition to all of the aforementioned properties, they must also be flexible and extensible. For example, can end metal stock is typically coated on both sides. Thereafter, the coated metal stock is punched, scored for the "pop-top" opening and the pop-top ring is then attached with a pin which is separately fabricated. The end is then attached to the can body by an edge rolling process. Accordingly, if used on coil metal stock from which can ends are to be made, the coating applied there over must have associated therewith a minimum degree of toughness and flexibility such that it can withstand extensive fabrication processes, in addition to being water and chemical resistant so as to prevent adversely affecting the taste to the container's contents.

The container industry frequently utilizes coatings which are based on epoxy resins to provide some of these properties. However, epoxy resins as sole film-forming vehicles do not adequately wet out the metal substrate and, therefore, fail to provide the desired level of coalescence and film continuity. For these reasons, container coating technology frequently uses epoxy-graft copolymers. An epoxy-graft copolymer is an epoxy resin which has been grafted with monomers such as styrene and methacrylic acid. It has been observed that such epoxy resins which have been modified with acrylic monomers impart improved coalescence and film continuity to the resulting coating. It has also been noted that merely blending an epoxy resin with an acrylic polymer yields a coating composition which lacks the same level of homogeneity and stability which is obtained with an epoxy-graft copolymer.

U.S. Letters Patent 5,252,669 to Maska et al. discloses a water reducible resin suitable for use as a coating for metal substrates such as metal food and beverage cans. The resin disclosed in that patent is produced by grafting in organic solvent a thermoplastic polymer (having no crosslinkable moieties) which contains grafting agents onto a thermosetting polymer (having crosslinkable moieties) which contains acid functional groups to render the resultant polymer water soluble. The thermoplastic polymer is concurrently grafted onto a polyepoxide which has previously been phosphatized. The resulting polymer is used as the resinous binder in a waterborne coating for use as a container coating.

U.S. Letters Patent 5,290,828 to Craun et al. discloses an aqueous, low volatile organic content ("VOC") coating containing a polymeric binder which includes an addition co-polymer grafted epoxy polyester terpolymer. According to that patent, the coating disclosed therein is suitable for spray application to metal substrates such as beer and beverage cans. The graft terpolymer includes an unsaturated polyester, an epoxy resin and an addition co-polymer grafted to the polyester. The addition co-polymer includes from between 20 to 100 percent carboxyl functional ethylenic monomers. The addition co-polymer grafted epoxy polyester has an Acid Number above 30 to facilitate dispersing the terpolymer into water using a volatile base. The epoxy resin of that patent is not phosphatized.

U.S. Letters Patent 4,212,781 to Evans et al. discloses a process for modifying an epoxy resin by reacting in organic solvent the epoxy resin with addition polymerizable ethylenically unsaturated monomers to produce a reaction mixture which includes an epoxy-acrylic co-polymer mixture containing epoxy resin, graft epoxy-acrylic polymer, and associatively-formed ungrafted addition polymer. According to that patent, in the modified epoxy resins which are suitable for use in waterborne coating compositions spray applied onto can coatings, the in situ polymerized monomer must include acid functional monomers to provide sufficiently high acid functionality in the reaction mixture to effectuate stable dispersion in water, although solvent vehicles may also be used. Neither the epoxy groups of the epoxy resin nor of the final reaction mixture disclosed in that patent are phosphatized.

U.S. Letters Patent 5,428,084 to Swarup et al. discloses an amine defunctionalized epoxy resin and coating compositions which contain such a defunctionalized epoxy resin which are suitable for application onto metal surfaces such as can end stock. The amine defunctionalized epoxy resin is prepared by reacting a polyepoxide with ammonia or an amine having at least two active hydrogens, using close to a 1:1 ration of equivalents of epoxy to equivalents of ammonia or amine. The reaction of the polyepoxide resin with the ammonia or amine involves a ring-opening reaction where the resultant ungelled product is the amine-terminated product of a polyepoxide resin. The coating compositions disclosed in that patent comprise a resinous blend of the amine defunctionalized epoxy with another resin such as a vinyl addition copolymer containing about 5 to 25 weight percent of an alpha, beta ethylenically unsaturated carboxylic acid to provide dispersibility to the copolymer. The resultant coating compositions are water reducible and can additionally contain a curing agent. Neither the epoxy groups of the epoxy resin nor of the final reaction mixture disclosed in that patent are phosphatized.

According to the specifications of the aforementioned U.S. Patents, the reaction products and respective waterborne coatings disclosed therein provide water-based dispersions that are suitable for spray application as a sanitary liner or inside spray coating for beer and beverage can interiors. In order to facilitate water dispersibility of these reaction products, skilled artisans know that it is necessary for these coatings to contain a minimum amount of acid functional monomer.

When acid functional monomers are present in an amount which facilitates dispersibility, their presence in this concentration also tends to promote hydrophilicity of the of the resulting coating. The hydrophilicity of these monomers is undesirable, especially when the coating is designed for use on the interior of metal food and beverage containers. Specifically, skilled artisans know that hydrophilicity may lead to increased water absorption of the cured coating. This, in turn, can result in blushing and/or blistering during processing procedures.

Additionally, many of the waterborne coatings of the type disclosed in the aforementioned U.S. Patents are not suitable for use as roll applied coatings. Accordingly, skilled artisans would not be inclined to roll-apply such coatings onto flat metal stock used for fabrication of can ends.

As demonstrated above, although there are a number of coating compositions which may be applied onto can end stock, most of the conventional coatings have a number of deficiencies associated therewith which require the formulator, applicator and/or processor to compensate therefor. A coating which minimizes and/or eliminates many, if not all, of the aforementioned deficiencies would be greatly welcomed by the metal packaging industry.

SUMMARY OF THE INVENTION

One object of the present invention is to provide a polymeric product and/or coatings containing such a polymeric product which are blush and/or blister resistant and are able to withstand processing conditions encountered by metal containers in the food and beverage container industry.

Another object of the invention is to provide flexible and extensible coatings that adhere well to the metal substrates over which they are applied and are able to withstand extensive fabrication processes.

Still another object of the invention is to provide a solvent-borne coating which resists popping and is suitable for roll-coating application at relatively high line speeds.

These and other objects are achieved through the development and formulation of a novel phosphatized polymeric product which is formed by a process comprising the steps of: (a) forming an amine-extended resinous composition having unreacted epoxy groups by mixing, under free-radical initiated polymerization conditions, a polymerizable, ethylenically unsaturated monomeric component and a polyepoxide component; and (b) phosphatizing at least a portion of the unreacted epoxy groups of the resinous composition.

The present invention also provides novel coating compositions containing the aforedescribed polymeric product. While these novel coating compositions have a number of different uses, they are particularly useful for application to metal substrates such as can end stock since they result in a cured film which has excellent performance properties such as flexibility and extensibility, adhesion, resistance to boiling liquid pack tests and boiling water taste test results.

DETAILED DESCRIPTION OF THE INVENTION

The polymeric product of the present invention is formed by phosphatizing at least a portion of unreacted epoxy groups on an amine-extended resinous composition.

As used herein, the term "amine-extended resinous composition" refers to a composition which has at least some amine-extensions associated therewith. These amine extensions may result from any suitable means which will become apparent to those skilled in the art after reading this specification. Some examples of how such amine extensions may result is by the use of amine-extended reactants (e.g., amine-extended polyepoxides) and/or by amine extending the resulting resinous composition. Specific amine-extended reactants and/or methods of amine extending the resinous compositions will be discussed later in more detail. The level of amine extensions which needs to be present in the resinous composition depends, in part, on the desired end use of the polymeric product which is ultimately made therewith.

Typically, the resinous composition used when practicing this invention is formed in an organic solvent component by mixing with a polyepoxide component, under free-radical initiated polymerization conditions, and a polymerizable, ethylenically unsaturated monomeric component. As stated above, the resinous composition may receive a degree of its amine extension by using a polyepoxide component which comprises an amine-extended polyepoxide.

As used herein, the term "amine-extended polyepoxide" refers to the advancement of a polyepoxide to increase molecular weight by the reaction of a polyepoxide with an amine having at least two active hydrogen atoms. The reaction between the polyepoxide resin with the amine involves a simple ring opening reaction at the site of an active hydrogen, wherein the resultant product is an increased molecular weight polyepoxide having unreacted epoxy groups. The active hydrogen atoms can be on the same nitrogen atom (e.g., primary amines) or on different nitrogen atoms in a compound (e.g., diamines or other polyamines), wherein the active hydrogen atoms can be on the same nitrogen atom, or on two or more nitrogen atoms.

Examples of primary amines suitable for use in the present invention to chain-extend a polyepoxide include, without limitation, at least one of the following compounds: ethylamine, propylamine, isopropylamine and butylamine. A preferred primary amine useful for this purpose is butylamine. On the other hand, suitable diamines and other polyamines include, without limitation, at least one of the following compounds: hydrazine, ethylene diamine, propylene diamine, butylene diamine, hexylene diamine, diethylene triamine, tetraethylene pentamine, N-methylethylene diamine, N-methylbutylene diamine, N,N-dimethylethylene diamine, N,N-dipropylethylene diamine and N,N-dimethylhexylene diamine.

Also suitable for use in the present invention are hydroxyl alkyl amines. Examples of suitable hydroxyl alkyl amines include, without limitation, at least one of the following compounds: monoethanolamine, diethanolamine, N-methylethanolamine and dimethylethanolamine.

In a preferred embodiment of the invention, the polyepoxide component comprises a polyepoxide which is amine chain-extended with monoethanolamine. Without being bound to theory, it is believed that monoethanolamine is preferred since its two active hydrogen atoms are both on the same nitrogen atom and, via the ring opening reaction of an epoxy group of two separate polyepoxide molecules, one at the site of each of the active hydrogens, the polyepoxide can be amine chain-extended linearly. Another perceived reason for the preference of monoethanolamine is the fact that each monoethanolamine molecule so reacted provides a pendant hydroxyl group for crosslinking with a suitable curing agent.

The polyepoxide component may comprise: amine-extended polyepoxides, non amine-extended polyepoxides or a mixture thereof. If the polyepoxide component is made exclusively of non amine-extended polyepoxides, the resinous composition is amine-extended prior to it being phosphatized. On the other hand, if the polyepoxide component is made exclusively of non amine-extended polyepoxides, it is typically not necessary to further amine extend the resinous composition. However, if the polyepoxide component is made from a blend of amine-extended and non amine-extended polyepoxides, the resinous composition may need to be further amine extended, depending upon the desired properties of the polymeric product made therewith.

The polyepoxide useful in the polyepoxide component of this invention is typically a compound or mixture of compounds having more than 1.0 epoxy groups per molecule. One preferred class of polyepoxides include, without limitation, the polyglycidyl ethers of polyphenols. This preferred class of polyepoxides are typically produced by the etherification of a polyphenol with epichlorohydrin in the presence of an alkali. The phenolic compound in such a process can include, without limitation, at least one of the following compounds: 2,2-bis(4-hydroxyphenyl) propane; 1,1-bis(4-hydroxyphenyl)ethane; 1,1-bis(4-hydroxyphenyl) isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins. Preferred is the polyglycidyl ether of Bisphenol A.

Also suitable for use in the polyepoxide component are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl) propane. Cycloaliphatic polyepoxide resins can also be used. Such resins are prepared by epoxidation of cyclic olefins with organic peracids (e.g. peracetic acid).

The polymerizable, ethylenically unsaturated monomeric component can be selected from a wide variety of materials depending upon the properties desired. The selection of the appropriate contents of this monomeric component will become apparent to those skilled in the art after reading this specification.

When the polymeric product is to be used on can end stock, the polymerizable, ethylenically unsaturated monomeric component typically comprises a vinyl aromatic compound. Examples of such include, without limitation, at least one of the following aromatic compounds: styrene, alpha-methyl styrene, tertiary butyl styrene, vinyl toluene and vinyl xylene. Such monomers are preferred because of their good water and pasteurization resistance. When used, these monomers are typically present in an amount ranging from about 10 to about 70 weight percent of the monomer mixture, more typically in an amount ranging from about 20 to about 50 weight percent, and even more typically in an amount ranging from about 25 to about 40 weight percent.

In addition to the above, the polymerizable, ethylenically unsaturated monomeric component may also include, without limitation, alkyl esters of methacrylic acid which contain from 1 to 3 carbon atoms in the alkyl group. Specific examples of such esters are methyl methacrylate and ethyl methacrylate. These monomers typically are used in an amount up to about 40 weight percent of the monomeric component, more typically in an amount ranging from about 5 to about 30 weight percent, and even more typically in an amount ranging from about 10 to about 20 weight percent, where weight percents are based on total weight of the monomeric component.

Other monomers which may be included in the monomeric component are the alkyl esters of acrylic acid having from 2 to 17 carbon atoms in the alkyl group and alkyl esters of methacrylic acid having from 4 to 17 carbon atoms in the alkyl group. Examples of monomers of this type include, without limitation, at least one of the following compounds: ethyl acrylate, propyl acrylate, butyl acrylate, hexyl acrylate, 2-ethyl-hexyl acrylate, butyl methacrylate, 2-ethyl-hexyl methacrylate, lauryl methacrylate, and stearyl methacrylate. These monomers typically are used in an amount up to about 40 weight percent of the monomeric component, more typically in an amount ranging from about 5 to about 30 weight percent, and even more typically in an amount ranging from about 10 to about 20 weight percent, where weight percents are based on total weight of the monomeric component.

Still other monomers which can be used in the monomeric component include, without limitation, vinyl monomers such as ethylene, propylene and the like, the vinyl halides, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, methacrylonitrile and mixtures thereof These other monomers, when used, are typically present in an amount up to about 10 weight percent of the monomeric component, more typically in an amount ranging from about 1 to about 7 weight percent, and even more typically in an amount ranging from about 2 to about 5 weight percent.

Preferred monomers that may be used in the free-radical initiated copolymerization are N-(alkoxymethyl)acrylamide or N-(alkoxymethyl)methacrylamide having 1 to 4 carbon atoms in the alkoxy group. These monomers are preferred because they provide internal crosslinking through self-condensation. The preferred member of this group is N-(butoxymethyl)methacrylamide. Examples of other members include, without limitation, N-(butoxymethyl) acrylamide, N-(ethoxymethyl)acrylamide and mixtures thereof. These (meth)acrylamide monomers, when included, are present in amounts typically in the range of about 5 to about 35 weight percent of the monomeric component, more typically in an amount ranging from about 10 to about 30 weight percent, and even more typically in an amount ranging from about 15 to about 25 weight percent.

Other preferred monomers that may be used in the free radical initiated copolymerization are the hydroxyalkyl esters of acrylic acid and the hydroxyalkyl esters of methacrylic acid. These monomers are preferred because they provide hydroxyl groups for crosslinking with an aminoplast, phenolic or isocyanate curing agent. A preferred member of this group is the hydroxyalkyl ester of methacrylic acid, such as hydroxyethyl methacrylate. Examples of other members include, without limitation hydroxyethyl acrylate, hydroxypropyl acrylate, hydroxypropyl methacrylate. These monomers, when included, are present in amounts typically in the range of about 5 to about 35 weight percent of the monomeric component, more typically in an amount ranging from about 10 to about 30 weight percent, and even more typically in an amount ranging from about 15 to about 25 weight percent.

Acid functional polymerizable ethylenically unsaturated monomers may also be used in the free-radical initiated copolymerization, however, because such monomers tend to be hydrophilic, they are typically present in an amount ranging from about 1 to about 7 weight percent, typically in an amount ranging from about 2 to about 5 weight percent, said weight percentages being based on the weight of the total resins solids of the polymeric product. Acid functional monomers at levels higher than about 7 weight percent may cause instability in a solvent-borne coating composition. Additionally, the hydrophilicity of these monomers is undesirable because it may lead to increased water absorption of the cured coating, resulting in blushing and/or blistering upon exposure to high temperature/high humidity conditions or during processing. Examples of acid functional monomers which can be used include, without limitation, alpha, beta-ethylenically unsaturated carboxylic acids containing from 3 to 8 carbon atoms such as acrylic acid and methacrylic acid.

In one preferred embodiment of the present invention, the ethylenically unsaturated monomer comprises a mixture of N-(butoxymethyl)methacrylamide, butyl acrylate, styrene and acrylic acid. Even more preferred is a mixture comprising hydroxyethyl methacrylate, styrene, butyl methacrylate, methacrylic acid and mixtures thereof.

The copolymerization process used in making the resinous composition is carried out in the presence of an organic solvent component which comprises at least one organic solvent compound. The organic solvent component typically comprises at least one solvent which dissolves the polyepoxide(s) present in the polyepoxide component and/or the monomer(s) present in the monomeric component. Any suitable organic solvent(s) which can dissolve the polyepoxide(s) and/or monomer(s) employed can be used when practicing this invention. Examples of such organic solvents include, without limitation, at least one of the following: xylene, methyl ethyl ketone, methyl butyl ketone, ethanol, propanol, isopropanol, butanol, butoxyethanol, ethylene glycol monobutyl ether, diethylene glycol monobutyl ether and mixtures thereof. The organic solvent component can also comprise a mixture of at least two miscible solvents wherein one dissolves the polyepoxide(s) present in the polyepoxide component and the other dissolves the monomer(s) present in the monomeric component. In one preferred embodiment, the organic solvent component comprises a blend of methyl ethyl ketone and xylene. In an even further preferred embodiment, the organic solvent component comprises a mixture of at least two of the following: the diethylene glycol monobutyl ether, ethylene glycol monobutyl ether and n-methyl pyrolidone.

Typically the polymeric product of the present invention is produced by heating to reflux the polyepoxide component and an organic solvent(s) which is/are capable of dissolving the polyepoxide(s) present in the polyepoxide component. Thereafter, the polymerizable, ethylenically unsaturated monomeric component is added with an initiator component, under free-radical initiated co-polymerization conditions. This forms a resinous composition containing unreacted epoxy groups. If the none of the polyepoxide present in the polyepoxide component is amine chain-extended prior to the in situ free-radical initiated co-polymerization, the resinous composition is chain-extended with an amine. On the other hand, if some of the polyepoxide present in the polyepoxide component is amine chain-extended prior to the in situ free-radical initiated co-polymerization, the resinous composition may need to be further chain-extended with an amine, depending upon the desired properties of the resulting product.

When practicing the present invention, the ratio of the weight percent of the polymerizable, ethylenically unsaturated monomeric component, to the weight percent of the polyepoxide, component, typically ranges from about 5:95 to about 20:80, where the weight percents are based upon the total weight of the monomeric component and the polyepoxide component. Preferably, the ratio of the monomeric component's weight percentage to the polyepoxide component's weight percentage ranges from about 10:90 to about 25:75.

After an amine-extended resinous composition having unreacted epoxy groups has been obtained, at least a portion of the resinous composition's unreactive epoxy groups are phosphatized to form a polymeric product. Phosphatization can be accomplished by any means which will become apparent to those skilled in the art after reading this specification. One example of a way to phosphatize the resinous composition's unreactive epoxy groups is by reacting phosphoric acid with unreacted epoxy groups, typically in an organic solvent or solvent blend. This reaction is an esterification between the hydrogen ions of the phosphoric acid and the epoxy groups. It should be noted that for purposes of phosphatization herein, phosphoric acid is taken to be monofunctional with regards to epoxy.

The phosphoric acid can be a 100 percent orthophosphoric acid, superphosphoric acid or the aqueous solutions thereof, such as 85 percent phosphoric acid solution. Other forms of phosphoric acid and triphosphoric acid can be used. Also, the polymeric or partial anhydrides of phosphoric acids can be used. Typically used are aqueous phosphoric acid solutions which are about 70 to 90 percent, preferably about 85 percent phosphoric acid. The amount of phosphoric acid typically used in the practice of the present invention is about 0.1 to 2.0 percent, preferably about 0.2 to 1.0 percent where percents are based on total weight of resin solids. For purposes of the present invention, it is desirable that there is not an excess of phosphoric acid present because excess acid tends to impart hydrophilicity to the cured coating, and can form salts during the high pressure steam retort processing required for some foods and beverages.

In those instances when such a high degree of flexibility is not critical to the end use, the resinous composition need not contain any amine chain extensions. This can be accomplished by using a polyepoxide component which does not contain any amine chain-extended polyepoxides When the polymeric product of the present invention is used as part of a coating composition, it is typically blended with a curing agent. The types and amounts of curing agents employed depend, in part, of the desired properties of the resulting product. Notwithstanding the above, typical examples of curing agents which can be employed include, without limitation, at least one of the following compounds: aminoplasts, phenolic curing agents and blocked or unblocked isocyanates. In many instances, the preferred curing agent comprises an aminoplast. While vinyl addition resins derived from N-(alkoxymethyl)methacrylamide and N-(alkoxymethyl)acrylamide are capable of crosslinking without an external crosslinking agent, such curing agents may, nevertheless, be added.

Aminoplast curing agents are the condensation products of an aldehyde (e.g., formaldehyde, acetaldehyde, crotonaldehyde and benzaldehyde), with an amino- or amido group-containing substance (e.g., urea, melamine and benzoguanamine). Products obtained from the reaction of alcohols and formaldehyde with melamine, urea or benzoguanamine are preferred. Alcohols useful in making the etherified products are the monohydric alcohols, such as methanol, ethanol, propanol, butanol, hexanol, benzyl alcohol, cyclohexanol and ethoxyethanol. An etherified melamine-formaldehyde resin is one example of a preferred aminoplast curing agent.

On the other hand, phenolic curing agents include the condensation product of an aldehyde with a phenol. In many instances, formaldehyde and acetaldehyde are the preferred aldehydes used when making phenolic curing agents. Various phenols can be used. Examples of such include, without limitation, at least one of the following: phenol, cresol, p-phenylphenol, p-tert-butylphenol, p-tert-amylphenol and cyclopentylphenol. In many instances, the preferred phenolic curing agent is the condensation of a phenol with formaldehyde such as METHYLON 75108, a commercially available phenolic curing agent from Occidental Chemical Corp.

A number of blocked polyisocyanates are satisfactory crosslinking agents for use with the polymeric product of the present invention. Suitable polyisocyanates crosslinking agents will become apparent to those skilled in the art after reading this specification. Generally, the organic polyisocyanates are blocked with a volatile alcohol, epsilon-caprolactam or ketoxime. These blocked polyisocyanates typically become unblocked at elevated temperatures (e.g., at temperatures above about 100° C.).

Typically, in the coating composition of the present invention, the polymeric product is present in an amount up to about 100 weight percent. Preferably, the polymeric product is present in an amount ranging from about 60 to about 99 weight percent, more preferably in an amount ranging from about 80 to about 97 weight percent, and even more preferably in an amount ranging from about 90 to about 95 weight percent, wherein the weight percentages are based on the weight of the total resin solids in the coating composition.

If used, the curing agent is typically present in an amount ranging from about 2 to about 40 weight percent, wherein the weight percentages are based on the weight of the total resin solids in the coating composition. Preferably, the curing agent is present in an amount ranging from about 3 to about 15 weight percent, and more preferably in an amount ranging, from about 5 to about 10 weight percent.

The coating compositions of this invention may contain other optional components such as pigments, fillers, anti-oxidants, flow control agents, surfactants and the like. When used, these optional ingredients are typically present in amounts of up to about 30 weight percent of the coating composition, more typically in amounts up to about 20 weight percent, and even more typically in amounts up to about 10 weight percent.

Additionally, adjuvant resins such as polyether polyols, polyester polyols, alkyds and acrylic polymers can be blended with the coating composition prepared in accordance with this invention. In one preferred embodiment of the invention, the coating composition contains polytetramethylene glycol (e.g., POLYMEG 1000, commercially available from QO Chemicals, Inc). The adjuvant resins, when used, are typically present in amounts of up to about 30 weight percent of the coating composition, more typically in amounts up to about 20 weight percent, and even more typically in amounts up to about 10 weight percent.

The coatings of the present invention have been found to possess particular advantages when utilized on high speed roll coating lines for coating sheet aluminum stock intended for containers, but the coatings could be applied onto any substrate, particularly metallic substrates, by any conventional process.

Typically, the coatings are cured at elevated temperatures on the order of from about 572° F. to about 662° F. (300° C. to 350° C.) to a peak metal temperature of about 450°±30° F.(232°±17° C.). Coating thicknesses, as determined by dry film weight, typically range from about 1 to about 10 milligrams per square inch, more typically from about 3 to about 9 milligrams per square inch. and even more typically from about 5 to about 8 milligrams per square inch.

EXAMPLES

The present invention is more particularly described in the following examples which are intended as illustration only and are not intended to limit the scope thereof. Unless otherwise indicated, all weight percentages are based on the total weight of resin solids.

PREPARATION OF THE POLYMERIC PRODUCTS

Comparative Example 1

This comparative example illustrates the preparation of a polymeric product wherein an epoxy resin was phosphatized with phosphoric acid. The polymeric product was prepared from the mixture of the following ingredients:

| INGREDIENTS | Parts by Weight (grams) |
| --- | --- |
| Charge 1 | |
| EPON 1007[1] | 748.2 |
| Diethylene glycol monobutyl ether[2] | 365.2 |
| n-Butanol | 146.1 |
| Methyl ethyl ketone | 219.1 |
| Charge 2 | |
| Phosphoric acid solution[3] | 7.8 |
| Charge 3 | |
| Deionized water | 13.8 |

[1]Bis-epoxy with epoxy equivalent weight in the range of 1850 to 2300, commercially available from Shell Oil and Chemical Co.
[2]Commercially available as BUTYL CARBITOL, from Union Carbide Corp.
[3]85% active aqueous solution.

To a suitable reaction vessel, Charge 1 was added at ambient temperatures and the EPON 1007 was allowed to dissolve in the solvent blend. The reaction temperature was increased to 100° C. at which time Charge 2 was added and the batch was held at that temperature form about 30 minutes. Charge 3 was then added with a subsequent 2 hour hold period. The polymeric product thus formed was then diluted with Charge 6 to a theory solids of about 53.55%.

Example 2

This example illustrates the preparation of a phosphatized polymeric product of the present invention wherein, in the presence of an epoxy resin, ethylenically unsaturated monomers are co-polymerized under free radical initiated polymerization conditions. The unreacted epoxy groups are subsequently phosphatized with phosphoric acid. The polymeric product was prepared from the mixture of the following ingredients:

| INGREDIENTS | Parts by Weight (grams) |
| --- | --- |
| Charge 1 | |
| EPON 1007 | 800.0 |
| Diethylene glycol monobutyl ether | 520.0 |
| Isopropanol | 40.0 |
| Charge 2 Premix of: | |
| Butylacrylate | 36.0 |
| Hydroxyethyl methacrylate | 8.0 |
| Methacrylic acid | 5.6 |
| Styrene | 30.4 |
| Charge 3: | |
| Di-tertiary-butyl peroxide | 1.6 |
| Ethylene glycol monobutyl ether | 25.0 |
| Charge 4: | |
| Di-tertiary-butyl peroxide | 2 ×0.2 |
| Ethylene glycol monobutyl ether | 2 ×2.0 |

| INGREDIENTS | Parts by Weight (grams) |
| --- | --- |
| Charge 5: | |
| Phosphoric acid solution[1] | 7.5 |
| Charge 6: | |
| Deionized water | 14.0 |

[1]Aqueous solution, 85% active.

To a suitable reaction vessel equipped with a stirrer, reflux condenser, thermometer, heating mantle and nitrogen inlet, Charge 1 was added and the epoxy resin was allowed to dissolve in the solvents at ambient temperatures. The temperature was then increased to reflux (140° C. to 150° C.), at which time the monomer premix of Charge 2 and the initiator solution of Charge 3 were simultaneously added at a constant rate over a period of 3 hours while maintaining a reflux. The temperature was held at a temperature of 140° C. to 150° C. for an additional hour following which the two initiator solution additions of Charge 4 were made separately, with a 90 minute hold period after each addition. Thereafter the reaction temperature was cooled to 120° C. and Charge 5 was added with a subsequent 30 minute hold period. The deionized water of Charge 6 was then added and the reaction temperature was held at 120° C. for an additional 2 hours. The polymeric product thus formed was subsequently diluted with diethylene glycol monobutyl ether to a theory solids of 50%.

Example 3

This example describes the preparation of a polymeric product of the present invention wherein the epoxy is amine chain-extended prior to the free radical initiated in situ polymerization of ethylenically unsaturated monomers and the subsequent phosphatization of the unreacted epoxy groups. The polymeric product was prepared from the mixture of the following ingredients:

| INGREDIENTS | Parts by Weight (grams) |
| --- | --- |
| Charge 1: | |
| EPON 1007 | 800.0 |
| Diethylene glycol monobutyl ether | 520.0 |
| Monoethanolamine | 5.6 |
| Charge 2: Premix of: | |
| Styrene | 30.4 |
| Butyl acrylate | 36.0 |
| Hydroxyethyl methacrylate | 8.0 |
| Methacrylic acid | 5.6 |
| Charge 3: | |
| Di-tertiary-butyl peroxide | 1.6 |
| Ethylene glycol monobutyl ether | 25.0 |
| Charge 4: | |
| Di-tertiary-butyl peroxide | 2 ×0.2 |
| Ethylene glycol monobutyl ether | 2 ×2.0 |

-continued

| INGREDIENTS | Parts by Weight (grams) |
|---|---|
| Charge 5: | |
| Phosphoric acid solution[1] | 2.6 |
| Charge 6: | |
| Deionized water | 8.1 |

[1]Aqueous solution, 85% active.

To a suitable reaction vessel equipped with a stirrer, reflux condenser, thermometer, heating mantle and nitrogen inlet, the epoxy resin of Charge 1 was added which was then dissolved in the diethylene glycol monobutyl ether at ambient temperatures. The temperature was increased to 120° C. at which time the monoethanolamine was added to chain extend the epoxy. The reaction temperature was held at that temperature until the epoxy equivalent weight of the reaction mixture reached 5832. Thereafter the temperature was increased to reflux (140° C. to 150° C.), at which time the monomer premix of Charge 2 and the initiator solution of Charge 3 were simultaneously added at a constant rate over a period of 3 hours while maintaining a reflux. The temperature was held at 140° C. to 150° C. for an additional hour following which the two initiator solution additions of Charge 4 were made separately, with a 90 minute hold period after each addition. Thereafter the reaction temperature was cooled to 120° C. and Charge 5 was added with a subsequent 30 minute hold period. The deionized water of Charge 6 was then added and the reaction temperature was held at 120° C. for an additional 2 hours. The polymeric product thus formed was subsequently diluted with diethylene glycol monobutyl ether to a theory solids of 50%.

Example 4

This example describes the preparation of a polymeric product of the present invention wherein the epoxy is amine chain-extended prior to the free radical initiated in situ polymerization of ethylenically unsaturated monomers. The unreacted epoxy groups were not subsequently phosphatized. The polymeric product was prepared from the mixture of the following ingredients:

| INGREDIENTS | Parts by Weight (grams) |
|---|---|
| Charge 1: | |
| EPON 1007 | 800.0 |
| Ethylene glycol monobutyl ether | 520.0 |
| Charge 2: | |
| Monoethanolamine | 5.65 |
| Charge 3: | |
| Methyl isobutyl ketone | 45.0 |
| Ethylene glycol monobutyl ether | 25.0 |
| Charge 4: | |
| Bthylene glycol monobutyl ether | 35.5 |
| Di-tertiary-butyl peroxide | 4.8 |

-continued

| INGREDIENTS | Parts by Weight (grams) |
|---|---|
| Charge 5: Premix of: | |
| Styrene | 66.4 |
| Butyl acrylate | 72.0 |
| Hydroxyethyl methacrylate | 16.0 |
| Methacrylic acid | 5.6 |
| Charge 6: | |
| Di-tertiary-butyl peroxide | 0.5 |
| Ethylene glycol monobutyl ether | 2.0 |
| Charge 7: | |
| Di-tertiary-butyl peroxide | 0.50 |
| Ethylene glycol monobutyl ether | 2.0 |
| Charge 8: | |
| Methyl ethyl ketone | 540.5 |

To a suitable reaction vessel equipped with a reflux condenser and a means for maintaining a nitrogen blanket, Charge 1 was added at ambient temperatures under mild agitation. The mixture was heated to 110° C. at which time Charge 2 was added. The reaction mixture was held at this temperature until the epoxy equivalent became constant. Charge 3 was then added, and the mixture was heated to reflux, at about 150° C. Nitrogen flow was discontinued and Charges 4 and 5 were subsequently added over a period of about 3 hours. Charge 6 was then added, followed by a hold of about 1.5 hours. Charge 7 was then added, followed by a hold of about 1.5 hours. The temperature was allowed to cool to below 80° C. at which time Charge 8 was added. The polymeric product thus formed had a theory solids of about 45%.

Example 5

This example describes the preparation of a polymeric product of the present invention wherein a blend of epoxy resins are amine chain-extended with monoethanolamine and ammonia prior to the addition of ethylenically unsaturated monomers under free radical initiated polymerization conditions. Unreacted epoxy groups were not phosphatized. The polymeric product was prepared from the mixture of the following ingredients:

| INGREDIENTS | Parts by Weight (grams) |
|---|---|
| Charge 1: | |
| Epoxy resin[1] | 993.2 |
| EPON 1001 | 236.2 |
| Diethylene glycol monobutyl ether | 573.4 |
| n-Butanol | 551.7 |
| Charge 2: | |
| Styrene | 220.0 |
| Butyl acrylate | 56.9 |
| N-(butoxymethyl)acrylamide | 150.6 |
| Acylic acid | 19.0 |
| Charge 3: | |
| t-Butyl peracetate | 37.9 |
| n-Butanol | 361.2 |

-continued

| INGREDIENTS | Parts by Weight (grams) |
|---|---|
| Charge 4: | |
| Monoethanolamine | 27.0 |
| Charge 5: | |
| Ammonium hydroxide[2] | 26.5 |

[1]Bis-epoxy at 65% resin solids with an epoxy equivalent weight of about 2200, the synthesis of which is described in U.S. Pat. No. 5,528,084.
[2]28% aqueous solution.

To a suitable reaction vessel equipped with a reflux condenser and a means for maintaining a nitrogen blanket, the ingredients of Charge 1 were added under mild agitation at ambient temperature. The mixture was heated to 100° C. and held at this temperature until the epoxy equivalents became constant at which time the temperature was increased to 120° C. Charge 2 and 3 were then added over 3 and 4 hours, respectively, at a constant rate. The reaction temperature was subsequently held for 2 hours at 120° C. The reaction temperature was then cooled to 60° C. followed by the addition of Charges 4 and 5, and held at this temperature until all the epoxy groups were reacted as measured by epoxy equivalent weight (EEW). (An EEW greater than 20,000 is deemed herein to indicate that all epoxy groups have been reacted.) The reaction temperature was increased to and held at 120° C. for 2 hours. The product thus formed was then diluted with methyl ethyl ketone to a theory solids of about 35%.

Comparative Example 6

By way of comparison, this example illustrates the three-step preparation of a resinous product formed by cold-blending a chain-extended epoxy resin with a separately synthesized acrylic polymer. In step (A), an epoxy resin blend of the epoxy resins which were used in Example 5 immediately above was amine chain-extended with mono-ethanolamine and ammonium hydroxide. In step (B), a polymer was separately formed under free radical initiated polymerization conditions from the same blend of ethylenically unsaturated monomers as was used in Example 5 immediately above. In step (C) the chain-extended epoxy resin of (A) was cold-blended with the polymer of (B). The resinous product was formed in three steps from a mixture of the following ingredients:

| INGREDIENTS | Parts by Weight (grams) |
|---|---|
| STEP (A) | |
| Charge A1: | |
| Epoxy resin[1] | 3656.3 |
| EPON 1001 | 850.9 |
| Diethylene glycol monobutyl ether | 962.0 |
| Methyl ethyl ketone | 962.0 |
| Charge A2: | |
| Monoethanolamine | 99.5 |
| Charge A3: | |
| Ammonium hydroxide solution[2] | 98.8 |
| STEP (B) | |

| INGREDIENTS | Parts by Weight (grams) |
|---|---|
| Charge B1: | |
| n-Butanol | 1941.0 |
| Charge B2 | |
| Styrene | 2589.4 |
| Butyl acrylate | 417.7 |
| N-(butoxymethyl)acrylamide | 2156.8 |
| Acrylic acid | 227.1 |
| Charge B3: | |
| Methyl ethyl ketone | 910.3 |
| Benzoyl peroxide | 201.1 |
| n-Methyl pyrolidone | 204.3 |
| Charge B4 | |
| Diethylene glycol monobutyl ether | 1354.2 |
| STEP (C) | |
| Chain extended epoxy of Step A | |
| Polymer of Step B | |

[1]Bis-epoxy at 65% resin solids with an epoxy equivalent weight of about 2200, the synthesis of which is described in U.S. Pat. No. 5,528,084.
[2]28% aqueous solution.

Step (A): To a suitable reaction vessel equipped with a reflux condenser and a means for maintaining a nitrogen blanket, the ingredients of Charge A1 were added under mild agitation at ambient temperature. The reaction was heated to 55° C. at which time Charge A2 was added over 15 minutes. Charge A3 was then added over 15 minutes. The mixture was held at 55° C. until the epoxy equivalent becomes constant. At this time, 66 grams of the solvent was distilled. The solids of the product was adjusted to about 35% with methyl ethyl ketone.

Step (B): To a separate suitable reaction vessel equipped with a reflux condenser and a means for maintaining a nitrogen blanket, Charges B1 was added and heated to reflux. The ingredients of Charges B2 and B3 were added at a constant rate to the reaction vessel over periods of 4 and 7.5 hours, respectively. Upon completion of the additions of Charges B2 and B3, the reaction mixture was held at 100° C. for 2 hours. The polymer thus formed was then diluted with Charge B4 to a theory solids of about 42%.

Step (C): The chain extended epoxy blend of Step A and the polymer of Step B were mixed under mild agitation at ambient conditions to form a cold-blended resinous product.

Example 7

This example describes the preparation of an amine chain-extended phosphatized epoxy polymeric product of the present invention. A mixture of epoxy resins were amine chain extended with monoethanolamine, and a blend of ethylenically unsaturated monomers, to include N-(butoxymethyl)acrylamide (NBMA), were polymerized in situ under free radical initiated polymerization conditions. Unreacted epoxy groups were subsequently phosphatized. The polymeric product was prepared from the mixture of the following ingredients:

| INGREDIENTS | Parts by Weight (grams) |
|---|---|
| Charge 1: | |
| Epoxy resin | 930.8 |
| EPON 1001[2] | 221.4 |
| Diethylene glycol monobutyl ether | 537.3 |
| n-Butanol | 517.0 |
| Monoethanolamine | 12.9 |
| Charge 2: | |
| Styrene | 206.1 |
| Butyl acrylate | 53.3 |
| N-(butoxymethyl)acrylamide[3] | 141.1 |
| Acylic acid | 17.8 |
| Charge 3: | |
| t-Butyl peracetate | 35.5 |
| n-Butanol | 338.5 |
| Charge 4: | |
| Phosphoric acid solution[4] | 12.4 |
| Charge 5: | |
| Deionized water | 6.7 |
| Charge 6: | |
| Methyl ethyl ketone | 883.3 |

[1]Bis-epoxy at 65% resin solids with an epoxy equivalent weight of about 2200, the synthesis of which is described in U.S. Pat. No. 5,528,084.
[2]Bis-epoxy with epoxy equivalent weight of about 523, commercially available from Shell Oil and Chemical Co.
[3]55% active in a blend of butanol/xylene (82.2%/17.8%).
[4]Aqueous solution, 85% active.

To a suitable reaction vessel equipped with a reflux condenser and a means for maintaining a nitrogen blanket, the ingredients of Charge 1 were added under mild agitation at ambient temperature. The mixture was heated to 100° C. and held at that temperature until the epoxy equivalent became constant. The reaction temperature was then increased to 120° C. at which time Charge 2 and Charge 3 were added at a constant rate over 3 and 4 hours, respectively. The reaction temperature was subsequently held at 120° C. for 2 hours, followed by the addition of Charge 4. The reaction temperature was then cooled to about 100° C., followed by the addition of Charge 5. The reaction temperature was then increased to and held at 120° C. for 2 hours. The polymeric product thus formed was then diluted with Charge 6 to a theory solids of about 40%.

PREPARATION OF COATING COMPOSITIONS

Example A

This example describes the preparation of a coating composition of the present invention which contains the phosphatized epoxy resin, EPON 1007 of Example 1. The coating composition was prepared by mixing under mild agitation the following ingredients:

| INGREDIENTS | PARTS RESIN SOLIDS |
|---|---|
| Polymeric product of Example 1 | 168.1 |
| METHYLON 75108[1] | 10.0 |
| Methyl ethyl ketone | 50.0 |

[1]Phenol condensation product with 3-chloropropene and formaldehyde, commercially available from Occidental Chemical Corp.

After thoroughly blending the above ingredients, the coating composition was subsequently reduced to 22 seconds #4 Ford Cup application viscosity, which was 32.6% theoretical weight solids, with the following solvent blend: 32.6% methyl ethyl ketone; 30% diethylene glycol monobutyl ether; 28.% n-butanol; and 10% n-methyl pyrolidone. The resultant coating composition was applied to chrome treated aluminum substrate (0.0088 inch gauge) using a wirewound draw bar. The coated substrate was cured to a 465° F. (241° C.) peak metal surface temperature.

Example B

This example illustrates the preparation of a coating composition of the present invention which contains the polymeric product of Example 2 wherein in the presence of EPON 1007 epoxy resin, a preblend of ethylenically unsaturated monomers to include hydroxyethyl methacrylate, is co-polymerized under free radical initiated polymerization conditions. The resultant polymeric product is subsequently phosphatized. The coating composition was prepared by mixing under mild agitation the following ingredients

| INGREDIENTS | PARTS RESIN SOLIDS |
|---|---|
| Polymeric product of Example 2 | 159.9 |
| METHYLON 75108 | 10.0 |
| Methyl ethyl ketone | 50.0 |

After thoroughly blending the above ingredients, the coating composition was subsequently reduced to 22 seconds #4 Ford Cup application viscosity, which was 32.1% theoretical weight solids, with the solvent blend as described above in Example A. The resultant coating composition was applied and cured as above in Example A.

TESTING PROCEDURES

Cured coating compositions, were tested for a variety of performance properties. Dry adhesion was tested in accordance with ASTM D3359 (Method B). Pencil hardness was tested in accordance with ASTM D3363-92a using BEROL EAGLE TURQUOISE T-2375 pencils available from Empire Berol USA. MEK rub solvent resistance was tested in accordance with ASTM D5402 using methyl ethyl ketone. Orange soda stain testing can identify the coating's ability to resist abstraction of colorants from foods or beverages contained within the metal container. Cured test panels were immersed for five minutes in boiling orange soda. Panels were then rinsed thoroughly and compared to known commercial standards to determine the degree of staining (0=best). Boiling DIET COKE® and boiling acetic acid testing can identify the ability of a coating to withstand exposure to acidic foods and beverages. Blush resistance and adhesion were tested after cured test panels were immersed for 15 minutes in boiling DIET COKE.® Blush resistance was determined by comparison of the test panels immediately after testing with a commercial control or standard (0=best). Adhesion was tested in accordance with ASTM D3359 (Method B). Results are reported as percentage adherence of the coating to the substrate. Blush resistance and adhesion were also tested after cured test panels were immersed for 30 minutes in boiling acetic acid solution (3% by weight glacial acetic acid in deionized water). Blush resistance and adhesion were tested as described immediately above for the boiling DIET COKE.®

Flexibility ("flex") of the cured film was tested in accordance with the following procedure. Cured panels were cut into 2 inch×4½ inch pieces, with the substrate grain running perpendicular to the 4½ inch length. Each test piece was bent around a ¼ inch mandrel along its 4½ inch length with the coated side out. Each bent test piece was then subjected to impact testing using an impacter weighing about 2.1 kilograms dropped from a height of about 12 inches, such that one end was tightly closed by the impact forming a wedge. All test wedges were then subjected to soaking in a solution consisting of 350.4 grams of DIET SPRITE® and 20.8 grams ortho-phosphoric acid (85%) at 120° F. (49° C.) for 16 hours. Flex results are reported in "millimeters failure", i.e., the measurement in millimeters (mm.) of continuous cracking or spotting as measured from the closed end of the wedge.

Comparison of the coating compositions of Examples A and B illustrates the advantages in film continuity and appearance provided by the co-polymerization of the ethylenically unsaturated monomers in the presence of the epoxy resin. Although the performance data at this high temperature cure was quite similar for both coating compositions, the appearance of the coating composition of Example A, which contained the phosphatized epoxy-only resin was poor, i.e., the film was cratered and flow was poor. Results for the above described tests are reported in the following TABLE 1.

ylenically unsaturated monomers were polymerized in the presence of the previously amine chain-extended epoxy resin. The unreacted epoxy groups were subsequently phosphatized. The coating composition was prepared by mixing under mild agitation the following ingredients:

| INGREDIENTS | PARTS RESIN SOLIDS |
|---|---|
| Polymeric product of Example 3 | 95.1 |
| CYMEL 1123[1] | 4.9 |

[1]Benzoguanamine curing agent, commercially available from Cytec Industries, Inc.

The coating composition was reduced to 22.0% weight solids with the solvent blend described above in Example A: The resultant coating composition was applied to chrome treated aluminum substrate (0.0088 inch gauge) using a wirewound draw bar. The coated substrate was cured for about 13 seconds at 529° F. (276° C.) in a gas conveyor oven, that is, to a peak metal surface temperature of 430°

TABLE 1

| Coating Formula | Film weight (mm/in$^2$) and Appearance | Dry Adhesion | Pencil Hardness | MEK (double rubs) | Orange Soda Stain (0 = best) | Diet Coke ® (blush/ adhesion) | Acetic acid (blush/ adhesion) | Flex (mm) |
|---|---|---|---|---|---|---|---|---|
| Example A | 6.8–7.1; Poor flow; craters. | 100% | >4H | 18 | 0.0 | 1/100% | 1/100% | 16 ± 4 |
| Example B | 6.9–7.2; Excellent flow; clear film | 100% | 4H | 18 | 0.0 | 1/100% | 1/100% | 18 ± 2 |

Example C

This example describes the preparation of a coating composition of the present invention which contains the phosphatized polymeric product of Example 2 wherein in the presence of the epoxy resin, under free radical initiated polymerization conditions, ethylenically unsaturated monomers were polymerized in situ. The unreacted epoxy groups were subsequently phosphatized. The coating composition was prepared by mixing under mild agitation the following ingredients:

| INGREDIENTS | PARTS RESIN SOLIDS |
|---|---|
| Polymeric product of Example 2 | 94.0 |
| CYMEL 1123[1] | 6.0 |

[1]Benzoguanamine curing agent, commercially available from Cytec Industries, Inc The coating composition was reduced to 32.0% weight solids with the solvent blend described above in Example A. The resultant coating composition was applied to chrome treated aluminum substrate (0.0088 inch gauge) using a wirewound draw bar. The coated substrate was cured for about 25 seconds at 549° F. (287° C.), that is, to a peak metal surface temperature of 430° F. ( 221° C.).

Example D

This example describes the preparation of a coating composition of the present invention which contains the phosphatized polymeric product of Example 3 wherein, under free radical initiated polymerization conditions, eth- F.(221° C.). The cured test panels were tested according to the test methods as described above for Examples A and B.

Example E

This example describes the preparation of a coating composition of the present invention which contains the phosphatized polymeric product of Example 4 wherein, under free radical initiated polymerization conditions, ethylenically unsaturated monomers were polymerized in the presence of the previously amine chain-extended epoxy resin. The unreacted epoxy groups were not subsequently phosphatized. The coating composition was prepared by mixing under mild agitation the following ingredients:

| INGREDIENTS | PARTS RESIN SOLIDS |
|---|---|
| Polymeric product of Example 4 | 94.9 |
| CYMEL 1123 | 5.1 |

The coating composition was reduced to 21.0% weight solids with the solvent blend described above in Example A. The resultant coating composition was applied to chrome treated aluminum substrate (0.0088 inch gauge) using a wirewound draw bar. The coated substrate was cured for about 13 seconds at 529° F. (276° C.) in a gas conveyor oven, that is, to a peak metal surface temperature of 430° F.(221° C.).

The cured test panels were tested according to the test methods as described above for Examples A and B.

Comparison of the coating compositions of Examples C, D and E illustrates the advantages in flexibility with the use of the amine chain-extended epoxy containing polymeric product, as well as advantages of phosphatization of the unreacted epoxy groups. Test results are reported in the following TABLE 2.

TABLE 2

| Coating Formula | Film weight (mm/in²) and Appearance | Dry Adhesion | Pencil Hardness | MEK (double rubs) | Orange Soda Stain (0 = best) | Diet Coke® (blush/ adhesion) | Acetic acid (blush/ adhesion) | Flex (mm) |
|---|---|---|---|---|---|---|---|---|
| Example C | 6.8–7.3; Excellent flow; clear film | 100% | 4H | >100 | 0.0 | 3/50% | 1–2/100% | 35 |
| Example D | 7.4; Excellent flow; clear film | 100% | 4H | 40 | 0.0 | 0.5/100% | 0.5/100% | 17 |
| Example E | 7.4–7.6; clear, but fumed | 100% | 4H | 5–10 | 0.5 | 1.5–2.0/ 100 | 2–3/100 | 114; crazed |

It is evident from the foregoing that various modifications, which are apparent to those skilled in the art, can be made to the embodiments of this invention without departing from the spirit or scope thereof. Having thus described the invention, it is claimed as follows.

What is claimed is:

1. A solvent-borne polymeric product formed by a process comprising the following steps:
   (a) forming an amine-extended resinous composition having unreacted epoxy groups by mixing in the presence of organic solvent, under free-radical initiated polymerization conditions, reactants comprising:
      (i) a polymerizable, ethylenically unsaturated monomeric component comprising about 1 to about 7 weight percent of at least one acid functional polymenzable ethylenically unsaturated monomer, and
      (ii) an amine-extended polyepoxide component; and
   (b) phosphatizing at least a portion of the resinous composition's unreacted epoxy groups.

2. The polymeric product of claim 1 wherein the polyepoxide component comprises an amine-extended polyepoxide.

3. The polymeric product of claim 2 wherein the amine-extended polyepoxide is made by reacting a polyepoxide with an amine component.

4. The polymeric product of claim 3 wherein the amine component comprises at least one compound selected from the group consisting of: mono-primary amines, polyamines with at least two primary amine groups and polyamines with at least two secondary amine groups.

5. The polymeric product of claim 3 where the amine component comprises a diamine.

6. The polymeric product of claim 3 wherein the amine component comprises at least one compound selected from the group consisting of: butylamine, monoethanolamine and ethylenediamine.

7. The polymeric product of claim 3 wherein the amine component comprises monoethanolamine.

8. The polymeric product of claim 1 wherein the polyepoxide component comprises at least one polyepoxide compound having at least 1.0 epoxy groups per molecule.

9. The polymeric product of claim 8 wherein the polyepoxide component comprises at least one compound selected from the group consisting of: polyglycidyl ethers of a polyphenol, polyglycidyl ethers of polyhydric alcohols and cycloaliphatic polyepoxides.

10. The polymeric product of claim 9 wherein the polyepoxide component comprises at least one polyglycidyl ether of a polyphenol.

11. The polymeric product of claim 10 wherein at least one polyglycidyl ether of a polyphenol is selected from the group consisting of: 2,2-bis(4-hydroxyphenyl) propane; 1,1-bis(4-hydroxyphenyl)ethane; 1,1-bis(4-hydroxyphenyl)-isobutane; 2,2-bis(4-hydroxytertiarybutylphenyl)propane; bis(2-hydroxynaphthyl)-methane; 1,5-dihydroxynaphthalene; and 1,1-bis(4-hydroxy-3-allylphenyl)ethane.

12. The polymeric product of claim 9 wherein the polyepoxide component comprises at least one polyglycidyl ether of a polyhydric alcohol.

13. The polymeric product of claim 12 wherein at least one polyglycidyl ether of a polyhydric alcohols is derived from a polyhydric alcohol selected from the group consisting of: ethylene glycol, diethylene glycol, triethylene glycol, 1,2-propylene glycol, 1,4-butylene glycol, 1,5-pentanediol, 1,2,6-hexanetriol, glycerol and 2,2-bis(4-hydroxycyclohexyl)propane.

14. The polymeric product of claim 1 wherein the ethylenically unsaturated monomeric component further comprises at least one compound selected from the group consisting of:
   (a) vinyl aromatic compounds,
   (b) alkyl esters of methacrylic acid having from 1 to 3 carbon atoms in their alkyl group,
   (c) alkyl esters of acrylic acid having from 2 to 17 carbon atoms in their alkyl group,
   (d) alkyl esters of methacrylic acid having from 4 to 17 carbon atoms in the alkyl group,
   (e) vinyl monomers, and
   (f) hydroxyalkyl esters of (meth)acrylic acid.

15. The polymeric product of claim 14 wherein the ethylenically unsaturated monomeric component comprises at least one vinyl aromatic compound selected from the group consisting of: styrene, alpha-methyl styrene, tertiary butyl styrene, vinyl toluene and vinyl xylene.

16. The polymeric product of claim 14 wherein the ethylenically unsaturated monomeric component comprises at least one alkyl ester of methacrylic acid which contain from 1 to 3 carbon atoms in its alkyl group selected from the group consisting of: methyl methacrylate and ethyl methacrylate.

17. The polymeric product of claim 14 wherein the ethylenically unsaturated monomeric component comprises at least one alkyl ester of acrylic acid having from 2 to 17 carbon atoms in its alkyl group selected from the group consisting of: ethyl acrylate, propyl acrylate, butyl acrylate, hexyl acrylate, 2-ethyl-hexyl acrylate, butyl methacrylate, 2-ethyl-hexyl methacrylate, lauryl methacrylate and stearyl methacrylate.

18. The polymeric product of claim 14 wherein the ethylenically unsaturated monomeric component comprises at least one vinyl monomer selected from the group consisting of: ethylene, propylene, vinyl halides, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, and methacrylonitrile.

19. The polymeric product of claim 14 wherein the ethylenically unsaturated monomeric component comprises at least one hydroxyalkyl ester of (meth)acrylic acid selected from the group consisting of: hydroxyethyl methacrylate, hydroxyethyl acrylate, hydroxypropyl acrylate and hydroxypropyl methacrylate.

20. The polymeric product of claim 1 wherein the acid functional polymerizable ethylenically unsaturated monomer is selected from the group consisting of alpha, beta-ethylenically unsaturated carboxylic acids containing from 3 to 8 carbon atoms.

21. The polymeric product of claim 1 wherein the ethylenically unsaturated monomeric component further comprises at least one compound selected from the group consisting of alkyl esters of methacrylic acid, alkyl esters of acrylic acid, hydroxyalkyl esters of methacrylic acid, hydroxyalkyl esters of acrylic acid, N-(alkyoxymethyl) acrylamide and N-(alkyoxy-methyl)methacrylamide.

22. The polymeric product of claim 1 wherein the ethylenically unsaturated monomeric component further comprises a mixture of at least two of the compounds selected from the group consisting of: N-(butoxymethyl) methacrylamide, butyl (meth)acrylate, styrene, and hydroxyethyl methacrylate.

23. The polymeric product of claim 1 wherein at least a portion of the resinous composition's unreacted epoxy groups are phosphatized by reacting them with a phosphatizing composition comprising a phosphoric acid.

24. The polymeric product of claim 23 wherein the phosphatizing composition comprises at least one compound selected from the group consisting of: orthophosphoric acid, superphosphoric acid, triphosphoric acid polymeric phosphoric acids and partial anhydrides of phosphoric acids.

25. The polymeric product of claim 1 wherein the organic solvent component comprises at least one organic solvent selected from the group consisting of: xylene, methyl ethyl ketone, methyl butyl ketone, ethanol, propanol, isopropanol, butanol, butoxyethanol, ethylene glycol monobutyl ether and diethylene glycol monobutyl ether.

26. A solvent-borne coating composition comprising:
  (a) a solvent-borne polymeric product formed by a process comprising the following steps:
    (i) forming an amine-extended resinous composition having unreacted epoxy groups by mixing in the presence of organic solvent, under free-radical initiated polymerization conditions, reactants comprising:
      a. a polymerizable, ethylenically unsaturated monomeric component comprising about 1 to about 7 weight percent of the monomeric component of an acid functional polymerizable ethylenically unsaturated monomer, and
      b. an amine-extended polyepoxide component; and
    (ii) phosphatizing at least a portion of the resinous composition's unreacted epoxy groups; and
  (b) a curing agent.

27. The coating composition of claim 26 wherein the curing agent comprises at least one compound selected from the group consisting of: aminoplast curing agents, phenolic curing agents and blocked or unblocked isocyanate curing agents.

28. The coating composition of claim 26 wherein the polymeric product is present in an amount ranging from about 60 to about 99 weight percent, and wherein the curing agent is present in an amount ranging from about 2 to about 40 weight percent, said weight percentages being based on the weight of the total resin solids in the coating composition.

29. The coating composition of claim 26 further comprising at least one of the following: pigments, fillers, antioxidants, flow control agents, surfactants, polyether polyols, polyester polyols, alkyds and acrylic polymers.

* * * * *